US008711143B2

(12) United States Patent
Jin et al.

(10) Patent No.: US 8,711,143 B2
(45) Date of Patent: Apr. 29, 2014

(54) SYSTEM AND METHOD FOR INTERACTIVE IMAGE-BASED MODELING OF CURVED SURFACES USING SINGLE-VIEW AND MULTI-VIEW FEATURE CURVES

(75) Inventors: Hailin Jin, San Jose, CA (US); James L. Andrews, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 398 days.

(21) Appl. No.: 12/954,014

(22) Filed: Nov. 24, 2010

(65) Prior Publication Data
US 2013/0127847 A1 May 23, 2013

Related U.S. Application Data

(60) Provisional application No. 61/376,952, filed on Aug. 25, 2010.

(51) Int. Cl.
*G06T 17/00* (2006.01)

(52) U.S. Cl.
USPC .......................................................... 345/420

(58) Field of Classification Search
USPC .................................................. 345/419–428
See application file for complete search history.

(56) References Cited

U.S. PATENT DOCUMENTS

| 7,199,793 | B2* | 4/2007 | Oh et al. ......................... 345/419 |
| 7,525,555 | B2* | 4/2009 | Berger et al. .................. 345/619 |
| 7,528,831 | B2* | 5/2009 | Hong et al. .................... 345/420 |
| 7,639,250 | B2* | 12/2009 | Xu et al. ......................... 345/419 |
| 7,696,998 | B2* | 4/2010 | Bae ................................. 345/441 |
| 7,812,839 | B2* | 10/2010 | Chu et al. ....................... 345/442 |
| 8,059,888 | B2* | 11/2011 | Chen et al. ..................... 382/154 |
| 8,260,039 | B2* | 9/2012 | Shiell et al. ................... 382/154 |
| 8,270,704 | B2* | 9/2012 | Kim et al. ...................... 382/154 |
| 2005/0140670 | A1* | 6/2005 | Wu et al. ........................ 345/419 |
| 2006/0232583 | A1* | 10/2006 | Petrov et al. .................. 345/419 |
| 2009/0296984 | A1* | 12/2009 | Nijim et al. ................... 382/103 |

OTHER PUBLICATIONS

Sudipta N. Sinha et. al., Interactive 3D archutectural modeling from unordered photo collections, Dec. 2008, ACM Transactions on Graphics, vol. 27 Issue 5.*
A. van den Hengel, A. R. Dick, T. Thormählen, B. Ward, and P. H. S. Torr, "Videotrace: rapid interactive scene modelling from video," ACM Trans. Graph., vol. 26, No. 3, 2007, 5 pages.

(Continued)

*Primary Examiner* — Phi Hoang
*Assistant Examiner* — Mohammad H Akhavannik
(74) *Attorney, Agent, or Firm* — Wolfe-SBMC

(57) ABSTRACT

Various embodiments of an interactive system and methods for generating an image-based 3D model of an object from multiple images captured from different viewpoints of the object are described. A user may identify feature curves for the object by outlining the feature curves on a display of the images. The user may outline a feature curve in multiple images which depict the feature curve from different viewpoints. 3D shape constraints for the model may be generated dependent on the identified feature curves and camera parameters for the images. The user may also outline multiple single-view feature curves, such as silhouette curves, in single images. A 3D surface approximation for the model may be generated from the single-view feature curves. The 3D shape constraints and the 3D surface approximation may be used to generate a polygonal mesh which represents the surface of the 3D model of the object.

20 Claims, 11 Drawing Sheets

(56) References Cited

OTHER PUBLICATIONS

H. Wu and Y. Yu, "Photogrammetric Reconstruction of Free-Form Objects with Curvilinear Structures," The Visual Computer Journal, vol. 21, No. 4, 2005, pp. 203-216.

IsoOctree adaptive marching cubes code by Michael Kahzdan—Code: http://www.cs.jhu.edu/~misha/Code/IsoOctree/, 1 page downloaded Nov. 23, 2010.

M. Kazhdan, A. Klein, K. Dalal, H. Hoppe. "Unconstrained isosurface extraction on arbitrary octrees," Symposium on Geometry Processing 2007, 9 pages.

Erol, A., Bebis, G., Boyle, R. D., and Nicolescu, M. 2005. "Visual hull construction using adaptive sampling". In Workshop on Applications of Computer Vision, 234-241.

Furukawa, Yasutaka and Ponce, Jean. 2006. "Carved Visual Hulls for Image-Based Modeling", In European Conference on Computer Vision, 564-577.

Daniel Vlasic and Ilya Baran and Wojciech Matusik and Jovan Popovic. 2008. "Articulated mesh animation from multi-view silhouettes". In SIGGRAPH 2008, 9 pages.

Alec Rivers, Fredo Durand and Takeo Igarashi. 2010. "3D Modeling with Silhouettes", in SIGGRAPH 2010, 8 pages.

Mukta Prasad, Andrew Zisserman and Andrew W. Fitzgibbon. 2005. "Fast and Controllable 3D Modelling from Silhouettes" in Eurographics 2005, 4 pages.

CHOLMOD reference: Dynamic supernodes in sparse Cholesky update/downdate and triangular solves, T. A. Davis and W. W. Hager, ACM Trans. Math. Software, vol. 35, No. 4, 2009, 18 pages.

EPVH paper: Jean-sébastien Franco and Edmond Boyer. Exact polyhedral visual hulls, In British Machine Vision Conference, 2003, pp. 329-338.

\* cited by examiner

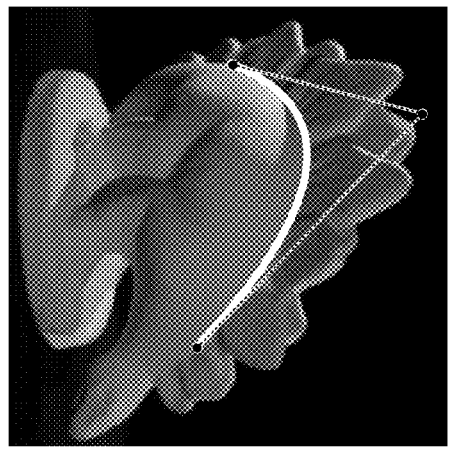
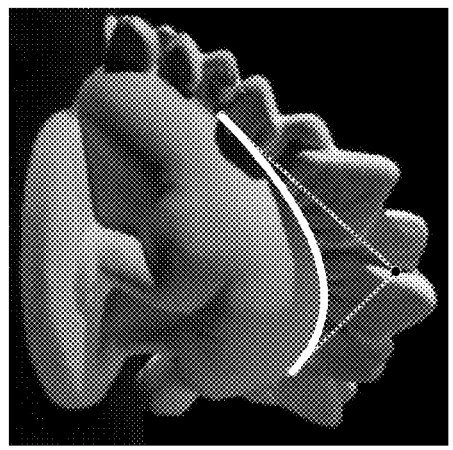
FIG. 5A    FIG. 5B
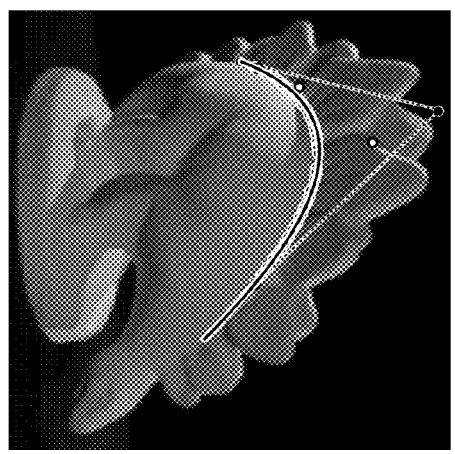
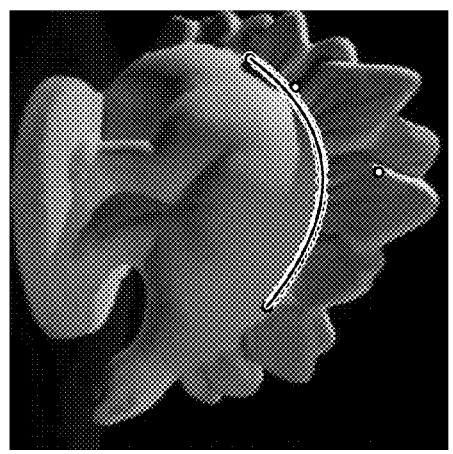
FIG. 6A    FIG. 6B

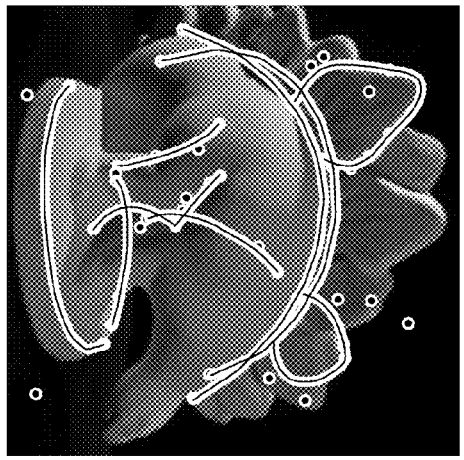 
FIG. 7A  FIG. 7B
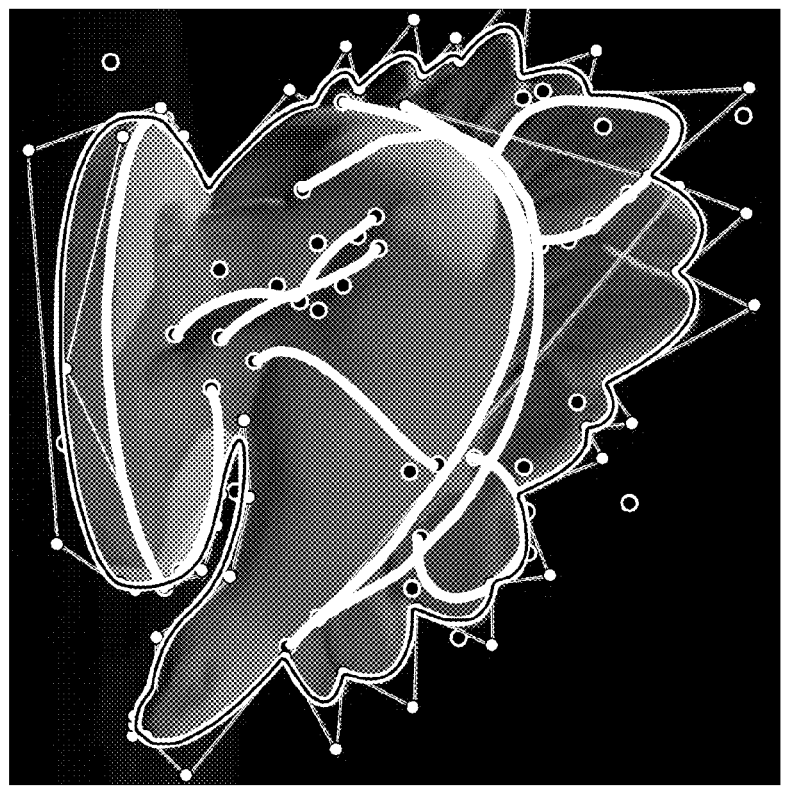
FIG. 8

SYSTEM AND METHOD FOR INTERACTIVE IMAGE-BASED MODELING OF CURVED SURFACES USING SINGLE-VIEW AND MULTI-VIEW FEATURE CURVES

PRIORITY INFORMATION

This application claims benefit of priority of U.S. Provisional Application Ser. No. 61/376,952 entitled "System and Method for Interactive Image-based Modeling of Curved Surfaces Using Single-view and Multi-view Feature Curves" filed Aug. 25, 2010, the content of which is incorporated by reference herein in its entirety.

BACKGROUND

Three-dimensional (3D) modeling of physical objects has many applications in the area of computer graphics. For example, computer-based 3D models of objects may be employed to generate animation, to insert digital images into film or photographic images, to design objects, and for many other purposes. As computing power has increased and 3D modeling algorithms have become more sophisticated, it has become possible to model objects of increasing complexity. For example, an object model may include data representative of hundreds or thousands, or more, individual surfaces of a modeled object.

Image-based 3D modeling systems may reconstruct a 3D model of an object from multiple images taken from different viewpoints of the object. Such image-based modeling systems may be interactive, such that a user may identify feature curves of the object by outlining such feature curves on a display of the images. Conventional 3D modeling systems may rely on feature curves which appear in multiple images of the object. Such systems may model smooth surfaces by creating patch boundaries from an intersecting network of feature curves that persist across the multiple images. However, the persistent, multi-view feature curves may not be dense or connected enough to accurately define a smooth object surface. Without sufficient intersections between the feature curves, the topology which defines how the 3D surface of the object connects the feature curves remains undefined.

Other conventional 3D modeling systems may rely on feature curves which appear in single-view images of the object. For example, such conventional systems may rely on single-view feature curves such as silhouette curves or occluding contour curves, or may rely on zero-view feature curves such as skeleton curves. However, such conventional systems are not capable of integrating multi-view feature curves, which results in a decrease in the accuracy of 3D models for particular types of objects. Furthermore, such conventional, single-view systems require additional manual annotation, when compared to multi-view 3D modeling systems, to reconstruct a 3D model of an object.

SUMMARY

Various embodiments of a system and methods for interactively generating an image-based three-dimensional (3D) model are described. The system for interactively generating an image-based 3D model may implement a 3D model generator configured to generate a 3D model of an object from multiple images of the object. The 3D model generator may receive a plurality of images of the object which are captured from different viewpoints around the object. For example, an object may be photographed from a number of different angles, resulting in images which capture different surfaces of the object. The images may be calibrated, such that intrinsic and extrinsic camera parameters for the images are known.

The 3D model generator may also receive input which identifies a plurality of feature curves for the object. For example, a user, via a user interface to the 3D model generator, may define a set of feature curves for the object by specifying the feature curves on a display of one or more of the images of the object. The identified feature curves may include at least one multi-view feature curve that is identified in multiple images of the object. The identified feature curves may also include at least two single-view feature curves that are identified in respective single images of the object.

The 3D model generator may generate, dependent on the at least one multi-view feature curve, one or more 3D shape constraints for the object. The 3D model generator may generate, dependent on the at least two single-view feature curves, an approximation of a 3D surface for the object. The 3D model generator may generate a 3D model of the object dependent on the one or more 3D shape constraints and the 3D surface approximation.

BRIEF DESCRIPTION OF THE DRAWINGS

FIGS. 5A and 5B illustrate examples of corresponding feature curves drawn on two different images taken from different viewpoints of an object, according to various embodiments.

FIGS. 6A and 6B illustrate an example of the two-view feature curve fitting method that may be used to generate a 3D shape constraint, according to various embodiments.

FIGS. 7A and 7B illustrate examples of multi-view 3D shape constraint curves which may be generated using a multi-view feature curve fitting method, according to various embodiments.

FIG. 8 illustrates an example of a silhouette curve which has been identified by a user on a display of an image, according to various embodiments.

Figure 1:
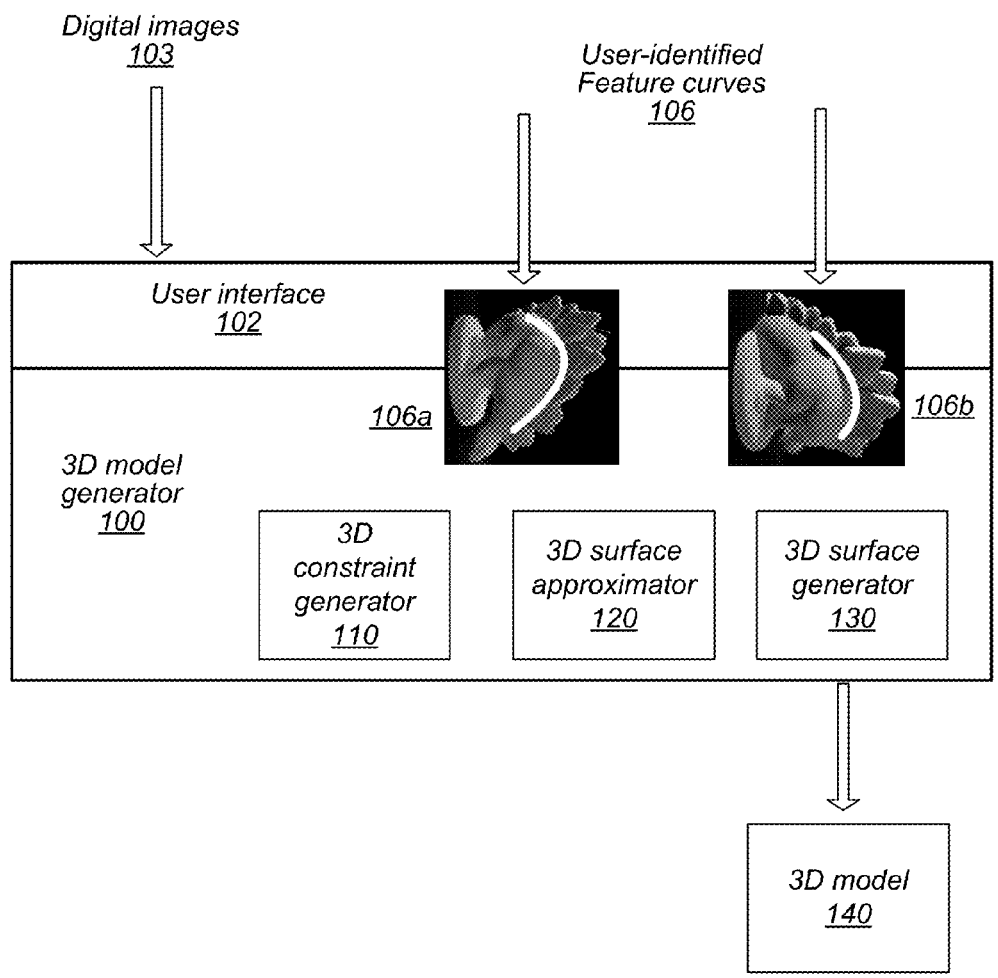
FIG. 1 illustrates an example embodiment of a 3D model generator which may be operable to generate an image-based 3D model of an object from single-view and multi-view feature curves for the object, according to various embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF EMBODIMENTS

In the following description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the description may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

3D Model Generator

A three-dimensional (3D) model of a physical object may be generated by capturing data from multiple images of the object taken from different viewpoints of the object. For example, an object, such as a building, may be photographed from a number of different angles, resulting in images which capture different surfaces of the building. The multiple images may be captured using one or more cameras placed in multiple positions around the object. The images may be calibrated, such that intrinsic and extrinsic camera parameters for the images are known. A 3D model which approximates the 3D surface of the object may be generated using user input, image data and camera parameters (i.e., intrinsic and extrinsic parameters) for the images of the object. This technique of generating a 3D model for an object, based on multiple images of the object, may be referred to as image-based modeling. A 3D model generated using the technique of image-based modeling may be referred to as an image-based 3D model.

An image-based 3D model may be represented by a set of constraints which define an approximation of the 3D surface of the modeled object. More specifically, the 3D model may be a set of constraints which define the shape of the 3D model (i.e., the constraints may represent curves and/or edges of the object). The 3D model may be reconstructed for visual display by extrapolating the surfaces of the 3D model from the set of constraints. As described in further detail below, the set of constraints which represent a 3D model of an object may be determined dependent on user input, image data and camera parameters from multiple images of the object taken from different viewpoints of the object.

As described in further detail below, a user, via a user interface, may define a set of feature curves for an object by identifying the feature curves on a display of one or more images of the object. For example, a user may identify features which define the shape of the object by outlining (i.e., by tracing or drawing) the features on a display of one or more images of the object. The object features, for example, may be points, lines or curves which define the shape of the object. As described in further detail below, the object features indicated by a user may be transformed into 3D shape constraints which may represent the shape of a 3D model of the object. The 3D shape constraints may be editable constraints by which the user may manipulate the shape of the 3D model.

Various embodiments of an interactive system and methods for generating a 3D, image-based model of and object using single-view and multi-view feature curves are described herein. A multi-view feature curve for and object may appear in multiple images captured from different viewpoints of the object. A single-view feature curve for an object, such as a silhouette curve, may appear in a single image captured from one viewpoint of an object. Embodiments of a 3D image-based model generation method may be implemented as or in a tool, module, plug-in, stand-alone application, etc. For simplicity, implementations of embodiments of the 3D image-based model generation method described herein will be referred to collectively as a 3D model generator.

FIG. 1 illustrates an example embodiment of a 3D model generator which may be operable to generate an image-based 3D model of an object from single-view and multi-view feature curves for the object. 3D model generator 100 may implement a user interface 102 that provides one or more textual and/or graphical user interface elements, modes or techniques via which a user may enter, modify, indicate or select feature curves on image displays and via which a user may initiate, interact with, direct, and/or control the method performed by module 100. 3D model generator 100 may be operable to obtain digital image data and camera parameters for a set of digital images, such as digital images 103 illustrated in FIG. 1. The set of digital images 103 may be multiple, calibrated images captured from a variety of different viewpoints around an object. Examples of digital images may include, but are not limited to, images captured by a digital camera, photographs scanned into a computer system, and video frames extracted from a digital video sequence. Digital image file types may include, but are not limited to Joint Photographic Experts Group (JPEG) files, Graphics Interchange Format (GIF) files, Tagged Image File Format (TIFF) files, or Portable Network Graphics (PNG) files.

3D model generator 100 may be operable to receive user input 106 which identifies feature curves that indicate the shape (i.e., curves and/or edges) of an object depicted in the digital images. User interface 102 may provide one or more textual and/or graphical user interface elements, modes or techniques via which a user may enter, modify, or select object feature curves on a display of the digital images. For example, a user may, via user interface 102 of module 100, identify features of an object in the digital images by physically outlining the object features on a display of one or more of the digital images 103. FIG. 1 illustrates, at images 106a and 106b, an examples of a feature curve that has been identified (i.e., outlined) by a user on two digital images which depict two different viewpoints of an object. The user-identified feature curve illustrated in images 106a and 106b is an example of a multi-view feature curve. As described in further detail below, 3D model generator 100 may transform the feature curves identified by the user into editable 3D shape constraints for 3D model 140.

3D model generator 100 may implement 3D constraint generator 110. 3D constraint generator 110 may be operable to generate 3D shape constraints from the multi-view feature curves drawn by a user on multiple images of the object. For example, 3D constraint generator 110 may generate a 3D shape constraint from the multi-view feature curve identified by a user in images 106a and 106b. To generate the 3D shape constraints, 3D constraint generator 110 may use a stereo-matching algorithm to generate initial 3D shape constraints from pairs of images which both contain a same feature curve that is depicted from different viewpoints. Images 106a and 106b in FIG. 1 illustrate an example of a pair of images which both contain a same feature curve that depicted from different viewpoints. As described in further detail below, 3D constraint generator 110 may use a non-linear Levenberg-Marquardt optimization algorithm to generate optimized 3D shape constraints from the initial 3D shape constraints. The optimization algorithm may optimize an initial 3D shape constraint for a feature curve by matching the 3D shape constraint to all views of the object in which the feature curve is present.

3D model generator 100 may implement 3D surface approximator 120. 3D surface approximator 120 may be operable to generate an approximation of the surface of 3D model 140 from single-view feature curves for the object. The approximation of the surface of 3D model 140 may be represented by a "visual hull" which may define the 3D volume, or topology, of the 3D object. A single-view feature curve, such as a silhouette curve, may be indicated by a user, via user interface 102 on a single image of the object. As described in further detail below, 3D surface approximator 120 may implement an adaptive octree method to generate the 3D surface approximation from the single-view feature curves identified by a user.

3D model generator 100 may also implement 3D surface generator 130. 3D surface generator 130 may generate, dependent on the identified 3D shape constraints and the 3D surface approximation, a 3D surface for 3D model 140. 3D surface generator may generate the 3D surface for 3D model 140 by optimizing the 3D surface approximation such that the 3D surface approximation satisfies the 3D shape constraints. As described in further detail below, the optimization of the 3D surface approximation may include smoothing the 3D surface and matching the 3D surface to the 3D shape constraints. More specifically, 3D surface generator 130 may execute a least squares method to solve for a smooth surface which interpolates position constraints from the 3D shape constraints.

From the 3D surface generated by 3D surface generator 130, module 100 may generate a polygonal mesh which may represent 3D model 140. 3D model 140 may have a set of editable constraints, from the set of feature curves identified by a user, that the user may manipulate to change the shape of 3D model 140. In addition to generating 3D model 140, module 100 may be used to display, manipulate, modify, and/or store the 3D model, for example to a memory medium such as a storage device or storage medium.

3D model generator 100 may be implemented as or in a stand-alone application or as a module of or plug-in for an image processing and/or presentation application. Examples of types of applications in which embodiments of module 100 may be implemented may include, but are not limited to, video editing, processing, and/or presentation applications, as well as applications in security or defense, educational, scientific, medical, publishing, digital photography, digital films, games, animation, marketing, and/or other applications in which digital image editing or presentation may be performed, i.e., where 3D aspects of scenes or image objects are relevant. Specific examples of applications in which embodiments may be implemented include, but are not limited to, Adobe® Photoshop® and Adobe® Illustrator®.

Work Flow

Figure 2:
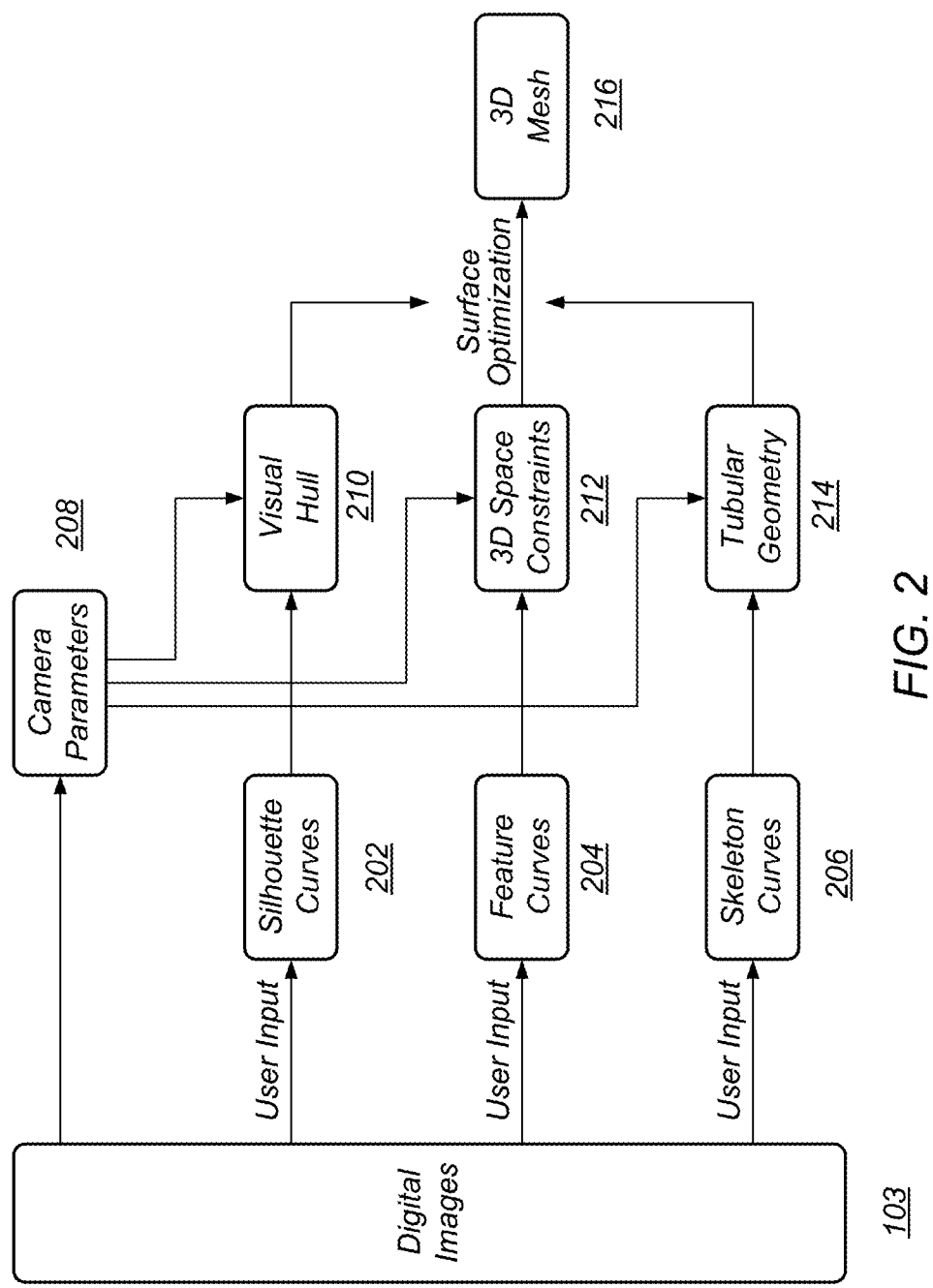
FIG. 2 is a block diagram that illustrates an example work flow for interactively generating an image-based 3D model, according to various embodiments.

FIG. 2 is a block diagram that illustrates an example work flow which may be performed by 3D model generator 100 to interactively generate an image-based 3D model for an object. A set of digital images 103 may depict a 3D scene or a 3D object from multiple different viewpoints. User input, via user interface 102, as described above, may identify, on digital images 103, features which define the shape of the 3D scene or object. For example, a user may indicate the features by drawing curves on a display of the images, such as silhouette (i.e., single view) curves 202, multi-view feature curves 204 and skeleton curves 206. 3D model generator 100 may retrieve camera parameters 208 from the image data for digital images 103. In some embodiments, the camera parameters may be obtained using a structure from motion process which may analyze camera motion (i.e., camera positions) over a certain range of time.

3D constraint generator 110 may generate 3D space constraints 212 for the object from the multi-view feature curves identified by the user input. 3D constraint generator 110 may also determine a tubular geometry 214 for the object from skeleton curves identified by the user input. 3D surface approximator 120 may generate a visual hull 210, which may be an approximation of the 3D surface of the object, from the silhouette, or single-view, curves identified by the user input. 3D surface generator 130 may merge visual hull 210, 3D curves 212 and tubular geometry 214 together to generate the 3D model of the object. For example, as illustrated in FIG. 2, 3D surface generator 130 may use a surface optimization process to generate a 3D surface that satisfies the constraints of visual hull 210, 3D curves 212 and tubular geometry 214. The surface optimization process may generate mesh 216. Mesh 216 may be a polygonal mesh which represents the surface of the 3D model of the object depicted in digital images 103.

Figure 3:
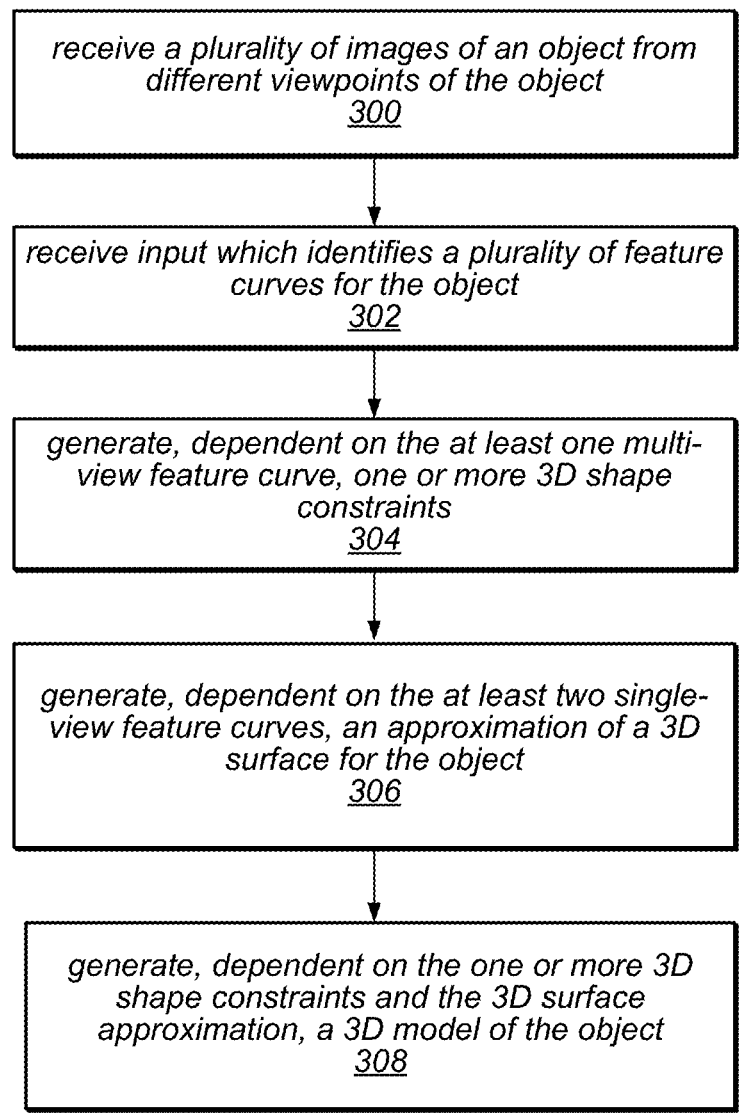
FIG. 3 illustrates an example method for interactively generating an image-based 3D model, according to various embodiments.

FIG. 3 illustrates one embodiment of a method for interactively generating an image-based 3D model. In some embodiments, 3D model generator 100, illustrated in FIG. 1, may implement the method of FIG. 3 to generate an image-based 3D model from single-view feature curves identified in digital images of an object and from multi-view feature curves identified in digital images of an object. The image-based 3D model may be represented by a polygonal mesh and may be defined by a set of editable constraints. A user may edit the shape of the 3D model by changing the positions of the editable constraints, for example, via user interface 102.

As shown at 300, the method illustrated in FIG. 3 may include receiving a plurality of images of an object from different viewpoints of the object. Multiple images of an object may be captured, such as with a digital camera, from different perspectives of the object. For example, one image may capture the view of a building from a position directly perpendicular to one of the sides of the building, while another image may capture a view of the same building from a position oriented at a slight angle to the side of the building. In some embodiments, 3D model generator 100 may extract 3D surface information for the object from the multiple images of the object and may use the 3D surface information to create a 3D model of the object. More specifically, 3D model generator 100 may be operable to recover relational data for the 3D surface of the object from the multiple digital images of the object.

The number of images used to represent different viewpoints of an object may vary from embodiment to embodiment and may also depend on the characteristics of the various surfaces of the object. A larger number of images may be needed to represent an object with complex, three-dimensional surface characteristics (i.e., curves, creases, ridges, valleys, etc.) and a smaller number of images may be needed to represent an object with relatively flat, planar surfaces. In some embodiments, a range of 30-40 images may provide sufficient 3D surface information to generate an accurate 3D model for the object. At least two images of a particular surface of an object may be needed to extract sufficient image data such that the 3D characteristics of the surface may be determined. The multiple images may be still images captured by a digital camera, video frames extracted from a digital video sequence, or digital images obtained by various other means.

The method illustrated in FIG. 3, may include, as shown at 302, receiving input which identifies a plurality of feature curves for the object. The input may be received from a user, via user interface 102. A user may identify the feature curves for the object on a display of one or more images of the object. For example, the user may identify a feature curve of an object on a display of an image of the object by outlining the feature curve on the image display. More specifically, the user may, using various drawing tools that may be implemented in user interface 102, draw or trace various feature curves which define the shape of an object in an image. FIGS. 5A and 5B illustrate examples of object feature curves which have been identified, via user input, on images taken from different viewpoints of the object. The white curves on the images illustrated in FIGS. 5A and 5B are examples of a same feature curve that has been identified in two different images of an object.

The user input which identifies the feature curves for the object may include at least one feature curve that is identified in multiple viewpoints of the object, such as the feature curve illustrated in FIGS. 5A and 5B. A feature curve that is identified for multiple viewpoints of the object may be referred to herein as a "multi-view" feature curve. As an example, a user may identify a same feature curve that is shown from different viewpoints in multiple images. The user input may also include at least two feature curves that are each identified in a respective single viewpoint of the object. A feature curve that is identified in a single viewpoint of the object may be referred to herein as a "single-view" feature curve. An example of a single-view feature curve may be a silhouette curve which outlines the outer edges of an object in an image. The feature curve which surrounds the outline of the object in the image illustrated in FIG. 8 is an example of a silhouette curve.

As shown at 304, the method illustrated in FIG. 3 may include generating, dependent on the at least one multi-view feature curve, one or more 3D shape constraints. As described in further detail below, 3D constraint generator 110 may be operable to generate 3D shape constraints from the feature curves drawn by a user on multiple images of the object. As shown at 306, the method illustrated in FIG. 3 may include generating, dependent on the at least two single-view feature curves, an approximation of a 3D surface for the object. As described in further detail below, 3D surface approximator 120 may use the single-view" feature curves to create an approximation of the 3D surface of the object. The approximation of the 3D surface of the object may be represented by a "visual hull" which illustrates the 3D volume, or topology, of the 3D object. The method illustrated in FIG. 3 may include, as shown at 308, generating, dependent on the one or more 3D shape constraints and the 3D surface approximation, a 3D model of the object. 3D surface generator 130 may generate a 3D surface for the 3D model by optimizing the 3D surface approximation to generate a 3D surface that satisfies the 3D shape constraints. The 3D surface generated by 3D surface generator 130 may be represented by a polygonal mesh and may include editable constraints which a user may manipulate to change the shape of the 3D model.

3D Shape Constraints 3D constraint generator 110 may generate 3D shape constraints from the feature curves identified by a user on multiple images of the object. To generate the 3D shape constraints, 3D constraint generator 110 may implement a stereo-matching algorithm. 3D constraint generator 110 may use the stereo-matching algorithm to generate initial 3D shape constraints from each pair of images which both contain a same feature curve. The initial 3D shape constraints generated by 3D constraint generator 110 may be 3D Bezier splines. 3D constraint generator 110 may use a non-linear Levenberg-Marquardt optimization algorithm to optimize each initial 3D constraint. For example, 3D constraint generator 110 may implement the non-linear Levenberg-Marquardt optimization algorithm to create, from an initial 3D shape constraint, a new 3D shape constraint. The new 3D shape constraint for a feature curve may be optimized to match all views of the feature curve which appear in the multiple images of an object. The new 3D shape constraint, or simply, the 3D shape constraint, for a feature curve may be a more accurate representation of the feature curve since the 3D shape constraint is dependent on all available views of the feature curve, rather than just a pair of views of the feature curve.

3D constraint generator 110 may implement a stereo-matching algorithm to generate initial 3D shape constraints from image pairs which both contain a same feature curve.

Figure 4:
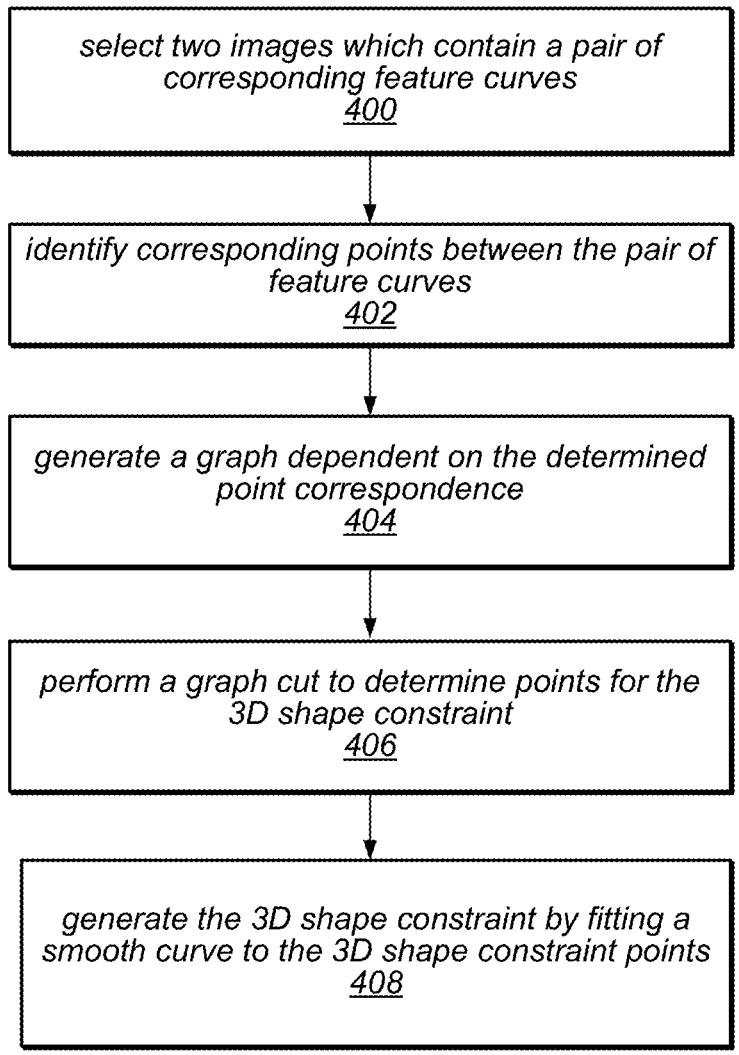
FIG. 4 illustrates a flowchart of a two-view curve fitting method which may be performed to generate initial 3D shape constraints from identified feature curves, according to various embodiments.

The stereo-matching algorithm may be implemented by generator 110 as a two-view curve fitting method in which an initial 3D shape constraint may be generated from two different views (i.e., from two different images) of a same feature curve. FIG. 4 illustrates a flowchart of a two-view curve fitting method which may be performed by constraint generator 110 to generate two-view 3D shape constraints from identified feature curves, according to various embodiments. The two-view 3D shape constraints may be generated dependent on image data from images which contain corresponding feature curves and dependent on camera parameters for the images.

As shown at 400, the method illustrated in FIG. 4 may include selecting two images which contain a pair of corresponding feature curves. As described above, a user may, via user interface 102, indicate the features, or shape, of an object depicted in an image by drawing feature curves on the image. A particular feature of an object may be shown, from different viewpoints, in multiple images of the object. More specifically, multiple images may include different viewpoints of the same feature of an object. A user may outline the same feature of the object in multiple images by drawing a feature curve on each image in which the feature is shown. FIGS. 5A and 5B illustrate examples of corresponding feature curves drawn on two different images taken from different viewpoints of an object. Note that the images illustrated in FIGS. 5A and 5B have been captured from different angles relative to the position of the object. Accordingly, the identified feature curves represent the object feature from different viewpoints.

In some embodiments, the user may indicate multiple images which contain a same feature curve of an object. From the multiple images that contain a same feature curve, 3D constraint generator 110 may select a pair of images. 3D constraint generator 110 may use various methods to select one pair of images which contain a same feature curve, when the feature curve is contained in more than two images. For example, 3D constraint generator 110 may select, from the set of images that contain a same feature curve, the two images that are separated by the widest angle range, as determined from the camera parameters for the images. As another example, 3D constraint generator 110 may select an arbitrary pair of images from the multiple images which contain the same feature curve. As yet another example, 3D constraint generator 110 may iteratively select each possible pair of the multiple images. In such an example, 3D constraint generator 110 may execute the method illustrated in FIG. 4 on each possible pair to determine the pair that results in the longest 3D shape constraint or the 3D shape constraint with the lowest error.

As shown at 402, the method illustrated in FIG. 4 may include identifying corresponding points between the pair of feature curves. Corresponding points on the feature curves may be points on the feature curves which represent an actual, same point on the object depicted in the images. Using image data for the selected pair of images, each feature curve may be transformed into a 2D Bezier curve. To identify the corresponding points on the feature curves, 3D constraint generator 110 may uniformly sample each of the 2D Bezier curves at fixed intervals. The fixed intervals used to uniformly sample the 2D Bezier curves may correspond to a particular number of pixels. For example, constraint generator 110 may sample each 2D Bezier curve at a fixed interval of five pixels. Constraint generator 110 may then determine an optimal correspondence between the point samples from the two feature curves.

Constraint generator 110 may evaluate the quality of various possible point correspondence mappings between the feature curve point samples to determine an optimal point correspondence. To indicate the quality of a point correspondence between any two point samples on the two feature curves, 3D constraint generator 110 may define a cost value. The cost value which indicates the quality of a point correspondence may be a measure of how closely the two points correspond to a same point on the actual object.

3D constraint generator 110 may use a variety of methods to calculate a cost value which may indicate the quality of point correspondence between two feature curve points. A cost that has a low value (for example, a value of "1"), may indicate a low cost, and, thus, a high quality point correspondence. A cost that has a high value (for example, a value of "5000"), may indicate a high cost, and, thus, a low quality point correspondence. In some embodiments, 3D constraint generator 110 may determine a cost value for each point correspondence by projecting a point sample on a feature curve in one image into an epipolar line in the other image. The cost value may be a low value (i.e., high quality of point correspondence) when the epipolar line intersects the feature curve in the other image. The cost value may a high value (i.e., low quality of point correspondence) when the epipolar line doesn't intersect the feature curve in the other image.

In other embodiments, 3D constraint generator 110 may use an alternative method to calculate a cost value which indicates the quality of point correspondence between points on two corresponding feature curves. For example, 3D constraint generator 110 may consider each possible point correspondence (i.e., pair of points) between the feature curve points when calculating the cost values. For each possible point correspondence, 3D constraint generator may solve for an optimal 3D point which has a minimal reprojection error with respect to the pair of feature curve sample points. 3D constraint generator 110 may then define the cost value of the determined 3D point (i.e., the cost value of the pair of feature curve points) as a value that is proportional to the reprojection error.

In other embodiments, 3D constraint generator 110 may use yet another method to calculate a cost value which indicates the quality of point correspondence between points on two corresponding feature curves. For example, 3D constraint generator 110 may combine the two methods described above. 3D constraint generator 110 may set a threshold level which defines an acceptable reproduction error. As described above, 3D constraint generator 110 may calculate, for each possible pair of feature curve points, an optimal 3D point which has a minimal reprojection error. The reprojection error calculated for an optimal 3D point for a pair of feature curve points may the reprojection error metric for the pair of feature curve points. If the reprojection error metric for a pair of feature curve points is below the defined threshold level, 3D constraint generator 110 may use the reprojection error metric for the pair of points as the cost value for the pair of points. If the reprojection error metric for a pair of feature curve points is above the defined threshold level, 3D constraint generator may use a high constant value (e.g., "5000," as in the example above) for the cost value of the pair of points.

Using this combined method for determining a cost value for a pair of feature curve points, 3D constraint generator 110 may only compute the true reprojection error metric for a subset of the possible feature curve point combinations. Such a method may enable 3D constraint generator 110 to bypass the cost value computation for pairs of feature curve points that have a reprojection error which is clearly higher than the acceptable threshold level for reproduction error. This combined method may be a slight variation of the epipolar line intersection test described above. For example, this combined method may effectively widen the epipolar line by an amount equivalent to the acceptable threshold level for reproduction error. 3D constraint generator 110 may not perform the full reprojection error computation for all feature curve points that fall outside of the widened epipolar line. Feature curve pairs which contain such points that fall outside of the widened epipolar line may be simply provided a cost value that is equivalent to the pre-defined high constant value (i.e., "5000").

As shown at 404, the method illustrated in FIG. 4 may include generating a graph dependent on the determined point correspondence. For example, 3D constraint generator 110 may generate a 2D graph in which each pair of corresponding feature curve points is represented by a node. The 2D graph may plot the cost value for each pair of corresponding feature curve points. Each node may represent a potential point on a 3D shape constraint which may be formed to represent the pair of feature curves. As shown at 406, the method illustrated in FIG. 4 may include performing a graph cut to determine points for a 3D shape constraint. For example, 3D constraint generator 110 may perform a graph cut on the 2D graph to select points that form a 3D shape constraint which represents the corresponding pair of feature curves. An optimal cut may be made through the graph such that the graph points are partitioned along a minimal cost path. The optimal cut may be a minimum cost curve which may include a collection of corresponding feature curve points with minimal cost values. The points on the minimum curve generated by the graph cut may be the points that are designated for forming the 3D shape constraint for the pair of feature curves.

As shown at 408, the method illustrated in FIG. 4 may include generating the 3D shape constraint by fitting a smooth curve to the 3D shape constraint points. 3D constraint generator 110 may linearize the curve fitting process by assuming a fixed number of control points and a fixed parameterization. To determine the fixed number of control points and fixed parameterization, 3D constraint generator 110 may select one of the pair of feature curves that has the most control points. Note that each one of the pair of feature curves is a 2D curve. 3D constraint generator 110 may generate a 2D curve parameter, $t\_i$, which maps each 3D shape constraint point to a corresponding 2D point on the selected 2D feature curve. 3D constraint generator 110 may define a new 3D curve parameter, $s\_i$, by subtracting $t\_0$ from 2D curve parameter, $t\_i$.

The 3D shape constraint may be represented as a Bezier spline. To optimize the 3D shape constraint, constraint generator 110 may require that at least four samples exist on each Bezier segment of the 3D shape constraint. If the above mapping of 2D feature curve points to 3D shape constraint points provides fewer than four samples for a Bezier segment of the 3D shape constraint, the Bezier segment may be merged into adjacent Bezier segments until a Bezier segment with a minimum of four samples is created. The 3D shape constraint may be renormalized such that each Bezier segment includes one unit of parameter space. Note that for each spatial dimension, each 3D sample and each 3D parameter value, $s\_i$, provide a single constraint equation. The Bezier control points may linearly combine the single constraint equation at the 3D parameter value, $s\_i$, to generate a coordinate value. 3D constraint generator 110 may use the method of normal equations to solve for the least-squares optimal control points which satisfy the constraint equations. The solution may a 3D Bezier spline which represents the 3D space constraint.

FIGS. 6A and 6B illustrate an example of the two-view curve fitting method that may be used to generate a 3D shape constraint. In FIG. 6A, a feature curve as originally drawn by a user is illustrated in black. The feature curve illustrated in FIG. 6A is one of a pair of corresponding feature curves. FIG. 6A also illustrates, as adjacent white circles behind the feature curve, the point correspondence locations determined by the graph cut procedure at 406 of FIG. 4. Note that the point correspondence locations illustrated in FIG. 6A represent only the feature curve extent that is shared by each one of the pair of feature curves. Accordingly, the point correspondence locations illustrated in FIG. 6A represent only a portion of the illustrated feature curve. FIG. 6B also illustrates, as adjacent white circles, the point correspondence locations determined via the graph cut procedure at 406 of FIG. 4. In addition, FIG. 6B illustrates, as a solid black line, a 3D Bezier curve, or 3D shape constraint generated by constraint generator 110 using the method of FIG. 4 to fit a 3D curve to the pair of 2D feature curves. In some embodiments, the method of FIG. 4 may be extended to more than two images.

3D constraint generator 110 may optimize each two-view 3D shape constraint generated via the two-view curve fitting method of FIG. 4. From each two-view 3D shape constraint, 3D constraint generator 110 may generate a multi-view 3D shape constraint which may represent all views of a feature curve that are contained in multiple images. 3D constraint generator 110 may generate a multi-view 3D shape constraint dependent on a corresponding two-view 3D shape constraint and dependent on image data for other images which contain the corresponding feature curve. As described above, the initial 3D shape constraint, which may be an output of the two-view curve fitting method illustrated in FIG. 4, may be represented as a 3D Bezier spline. 3D constraint generator 110 may optimize the 3D Bezier spline to generate the multi-view 3D shape constraint. In some embodiments, 3D constraint generator 110 may implement a non-linear Levenberg-Marquardt optimization algorithm to optimize the 3D Bezier spline. The optimized 3D Bezier spline may represent a multi-view 3D shape constraint for the 3D model of the object.

3D constraint generator 110 may perform a non-linear Levenberg-Marquardt optimization algorithm to generate each multi-view 3D shape constraint. To generate a multi-view 3D shape constraint, 3D constraint generator 110 may use an initial 3D shape constraint, for example, a "two-view" 3D shape constraint as generated by the method illustrated in FIG. 4. To generate a multi-view 3D shape constraint for an object feature curve, 3D constraint generator 110 may use all viewpoints of the feature curve that may exist in multiple images. For example, a same feature curve that identifies a particular feature for an object may be contained in multiple image views of the object that are taken from different viewpoints. 3D constraint generator 110 may use all of these different views of the feature curve to optimize a 3D shape constraint which represents the feature curve. In some embodiments, a user may, via user interface 102, identify all corresponding feature curves that are contained in multiple images. 3D constraint generator 110 may use the Levenberg-Marquardt optimization to transform the initial two-view 3D shape constraint into a multi-view 3D shape constraint that best fits all of the feature curves from different image viewpoints.

The non-linear optimization algorithm which may be executed by 3D constraint generator 110 may minimize the distance between samples of the multiple feature curves and the closest corresponding points on the initial 3D Bezier curve (i.e., the initial 3D shape constraint). The non-linear optimization may also minimize the length of the resulting multi-view 3D shape constraint. The length of the 3D shape constraint may be minimized in the optimization process because the error term of the non-linear optimization may not include excess curve geometry (in the 3D space constraint) that is beyond the limits of the original feature curves. Extraneous additions to the length of the 3D space constraint may cause the distance between the feature curves and the projected 3D space constraint to increase. Accordingly, to maintain an optimal 3D space constraint which closely matches the multi-view feature curves (i.e., that minimizes the distance between the feature curves and the 3D space constraint), the length of the 3D space constraint may be minimized. In other embodiments, 3D constraint generator 110 may alternatively solve this issue by minimizing the distance between samples on the projected 3D shape constraint and corresponding points on the feature curves. However, in this alternative solution, it may be difficult to determine a consistent scale for such distances because the closest point to a 3D shape constraint may occur on another image, which may result in a fundamental switch in scale during the optimization process.

3D constraint generator 110 may generate Jacobian matrices for the Levenberg-Marquardt optimization using finite differences. Accordingly, 3D constraint generator 110 may only need to compute the error terms for the Levenberg-Marquardt optimization. To compute the error terms for the Levenberg-Marquardt optimization, 3D constraint generator 110 may sample each feature curve at regular intervals and may compute an error term for each one of the feature curve samples. 3D constraint generator 110 may project the initial "two-view" 3D space constraint, determined as described above in reference to FIG. 4, to 2D image space as a rational Bezier curve.

To compute an error term for feature curve sample, 3D constraint generator 110 may determine a point on the rational Bezier curve that is closest in spatial proximity to the feature curve sample. To determine the closest point on the rational Bezier curve, 3D constraint generator 110 may locate a point on the rational Bezier curve for which a vector which connects the point on the Bezier curve to the sample on the feature curve is orthogonal to the curve direction of the rational Bezier curve. Such a point may be represented by the roots of an eight degree polynomial. 3D constraint generator 110 may solve for these polynomial roots using a general purpose Jenkins-Traub root finder. 3D constraint generator 110 may determine the distance between the feature curve sample and the identified closest point on the rational Bezier curve. The distance between the point and the sample that is determined by 3D constraint generator 110 may be the error term for the feature curve sample. In some embodiments, the determined distance between the rational Bezier curve point and the feature curve sample may be scaled by the local distance between samples on the feature curve. The local distance between samples on the feature curve may represent an approximation of the arc length of the curve segment that corresponds to the feature curve sample.

3D constraint generator 110 may also compute an error term which accounts for the length of the multi-view 3D shape constraint. 3D constraint generator 110 may first approximate the curve length of the multi-view 3D shape constraint. The squared error term for each of the feature curve samples may be minimized in the Levenberg-Marquardt optimization. Accordingly, the error term which represents the curve length of the multi-view 3D shape constraint may be appropriately scaled. The curve length error term may be scaled such that the squared value of the curve length error term is proportional in magnitude to a sum of squared feature curve sample error terms. 3D constraint generator 110 may scale the curve length error term by multiplying the length of the initial two-view 3D shape constraint by the total curve length of the feature curves and the number of feature curve samples. 3D constraint generator 110 may divide the result by the curve length of the initial two-view 3D shape constraint 3D constraint generator 110 may then compute the square root of the resulting value from the division calculation. The square root value may be an error term which represents the curve length of the multi-view 3D shape constraint.

3D constraint generator 110 may use the error terms computed for the feature curve samples and the error term computed for the length of the multi-view 3D shape constraint in a Levenberg-Marquardt optimization procedure to generate a multi-view 3D shape constraint for each initial two-view 3D shape constraint. FIG. 7A illustrates examples of multi-view 3D shape constraint curves which may be determined by 3D constraint generator 110 using the Levenberg-Marquardt optimization procedure. FIG. 7B illustrates a novel view of the multi-view 3D shape constraint curves illustrated in FIG. 7A. Note that the Levenberg-Marquardt optimization algorithm is described as an example algorithm that may be used as a curve-fitting method to generate multi-view 3D shape constraints. In other embodiments, other curve-fitting methods may be used to generate the multi-view 3D shape constraints.

3D Surface Approximation 3D surface approximator 120 may use single-view feature curves to create an approximation of the 3D surface of the object. The approximation of the 3D surface of the object may be represented by a "visual hull" which may define the 3D volume, or topology, of the 3D object. A single-view feature curve may be indicated by a user, via user interface 102 as described above, on a single image of the object. For example, a single-view feature curve may be a silhouette curve which indicates the outer edges of the object. FIG. 8 illustrates an example of a silhouette curve which a user has indicated by outlining the edges of the object depicted in the image. Single-view feature curves may be curves other than silhouette curves. For example, single-view feature curves may also be occluding contour curves.

Figure 9:
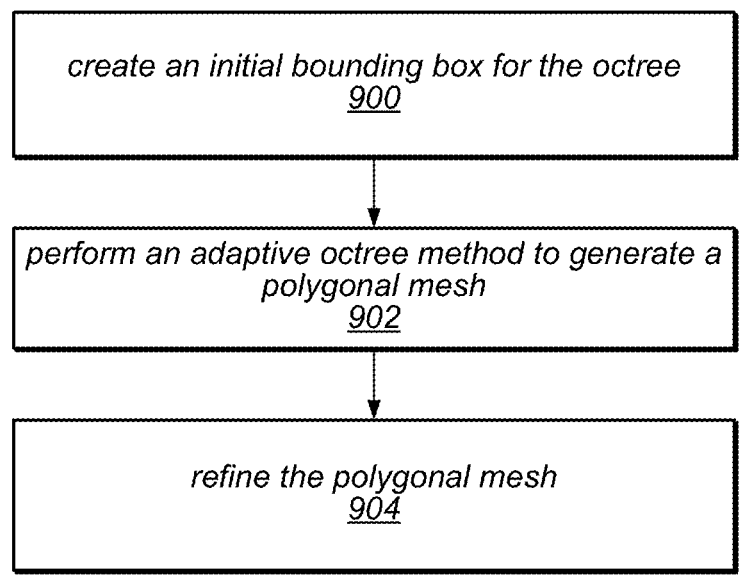
FIG. 9 is a flowchart of method that may be used to generate a 3D surface approximation from single-view feature curves, according to various embodiments.
Figure 11A:
FIG. 11A illustrates an example of a visual hull that has been generated from multiple silhouette curves, according to various embodiments.

FIG. 9 is a flowchart of method that may be used by 3D surface approximator 120 to generate a 3D surface approximation from single-view feature curves, according to various embodiments. The method illustrated in FIG. 9 may include constructing a visual hull that represents the 3D surface approximation. FIG. 11A illustrates an example of a visual hull that has been generated from multiple silhouette curves. In some embodiments, 3D surface approximator 120 may generate the visual hull using an adaptive octree method. For example 3D surface approximator 120 may generate an octree which represents the visual hull. The octree generated by 3D surface approximator 120 may be a multi-level data structure, or a "tree," in which each node of the tree may have up to eight sub-nodes. 3D surface approximator 120 may use the generated octree to partition the 3D space for the visual hull by recursively subdividing the 3D space into eight octants.

As shown at 900, the method illustrated in FIG. 9 may include creating an initial bounding box for the octree. The initial bounding box for the octree may need to be of a sufficient size to capture the full 3D geometry of the object. 3D surface approximator 120 may formulate the computation of the initial bounding box as a linear function. To create the initial bounding box for the octree, 3D surface approximator 120 may create a bounding box for each 2D single-view feature curve that has been identified by a user. 3D surface approximator 120 may project the bounding boxes for the single-view feature curves into multiple 3D frusta. Each 3D frustum may represent a bounding box for a corresponding single-view feature curve and may be defined by four planes. The planes of the 3D frusta may constrain the 3D space which the visual hull can occupy. Accordingly, each 3D frusta plane may define an equation for the linear program used to create the visual hull. 3D surface approximator 120 may solve the linear equation for the maximum and minimum x, y, and z coordinates that satisfy the constraints of the 3D frusta. The x, y and z coordinates determined by 3D surface approximator 120 may be the values of the initial bounding box for the octree.

As shown at 902, the method illustrated in FIG. 9 may include performing an adaptive octree method to generate a polygonal mesh. 3D surface approximator 120 may use, for example, an IsoOctree adaptive marching cubes algorithm, such as that described in [M. Kazhdan, A. Klein, K. Dalal, H. Hoppe. "Unconstrained isosurface extraction on arbitrary octrees," Symposium on Geometry Processing 2007]. 3D surface approximator 120 may refine the octree conservatively. For example, 3D surface approximator 120 may refine the octree only in areas of the bounding box which include the surface of the 3D object. To determine areas of the octree which include the surface of the 3D object, 3D surface approximator 120 may project each octant of the octree to each silhouette image. 3D surface approximator 120 may locate silhouette boundary pixels that are positioned within a projection of the octant.

To decrease octree refinement even further in regions of low surface detail, 3D surface approximator 120 may adapt the approach of the IsoOctree method, which may use the surface normals of triangles to estimate curvature of the 3D surface and may only refine the octree in regions which have an average curvature that exceeds a particular threshold. 3D surface approximator 120 may adapt this method to the creation of the visual hull by projecting the normals of the 2D single-view curves into 3D space. 3D surface approximator 120 may consider evaluate each normal that is projected into an octree cell. For normals that indicate an average surface curvature above a particular threshold, 3D surface approximator 120 may refine the corresponding octree cells. 3D surface approximator 120 may convert the refined octree into a polygonal mesh that represents the approximation of the 3D surface of the object (i.e., the visual hull).

As shown at 904, the method illustrated in FIG. 9 may include refining the polygonal mesh. The IsoOctree adaptive marching cubes method described above may generate very thin polygon regions, or slivers, within the polygonal mesh. The slivers may distort the polygonal mesh, which may result in inaccurate representations of the 3D surface. 3D surface approximator 120 may eliminate the slivers by generating mesh triangles with internal angles that are within a particular size range. For example, 3D surface approximator 120 may generate mesh triangles such the internal angles of the triangles are above a particular threshold and below a particular threshold. Refining the polygonal mesh in this manner may ensure that the polygonal mesh enables optimization of the 3D surface, as described in further detail below.

In various embodiments, 3D surface approximator 120 may use a variety of methods to eliminate the slivers in the polygonal mesh. For example, in some embodiments, 3D surface approximator 120 may use a snapping method which snaps vertices to grid values to eliminate the slivers. In other embodiments, 3D surface approximator 120 may use a collapsing method which collapses small mesh edges to eliminate the slivers. In yet other embodiments, 3D surface approximator 120 may apply a pass of Laplacian or Taubin smoothing to eliminate the slivers. The Laplacian or Taubin smoothing methods may be most effective in some embodiments and may require the least amount of computation resources. However, the Laplacian or Taubin smoothing methods may result in a larger number of vertices and faces than the snapping or collapsing methods. As a result, the Laplacian or Taubin smoothing methods may add additional computational cost to the subsequent mesh optimization phase described in further detail below. The collapsing method described above may introduce T-junction shapes, in which a triangle may be collapsed against a mesh edge. Applying a Laplacian smoothing technique to the T-junction vertices may eliminate the T-junction shapes in the polygonal mesh. In some embodiments, 3D surface approximator 120 may use the conformal setting of the IsoOctree marching cubes algorithm to restrict the rate of change of triangle size across the polygonal mesh for the 3D surface, to ensure that the polygonal mesh has good grading.

The algorithm described above for constructing the visual hull is an isosurface reconstruction algorithm, with the addition of optional methods for guiding the refinement of the octree. Accordingly, in some embodiments, the initial visual hull surface may be merged with any other implicit surface construction. The marching cubes algorithm described above may be adapted to add any additional desired implicit surface primitives. The resulting polygonal mesh may include the visual hull surface and the surface represented by the implicit surface primitives.

In some embodiments, some 3D surface shapes may be more accurately represented by a feature curve set that is more simplified and more direct than the visual hull. As an example, feature curves such as skeleton curves may accurately represent 3D shapes such as tree branches or animal limbs. As another example, feature curves such as axis+profile curves may accurately define 3D surfaces of revolution. A user may be able to indicate these types of curves on the images, in addition to the silhouette curves. 3D surface approximator 120 may include these features curves when the 3D surface approximation, or visual hull.

As an example, skeleton curves may be drawn manually on a display of an image, even though an image may not have explicit image features which indicate where the curves should be drawn. A rough estimate of the shape of the skeleton curves in several views may allow 3D surface approximator 120 to estimate the 3D geometry of the skeleton curves. The user may indicate a tube radius for each of the skeleton curves. The system may then generate an implicit representation for each one of the skeleton curves, which may enable generation of an implicit representation of the tubular geometry of the skeleton curves. The union of this implicit geometry and the implicit geometry of the visual hull may be triangulated as one shape using the marching cubes algorithm described above.

3D Surface Generation 3D surface generator 130 may generate a 3D surface for 3D model 140 by optimizing the 3D surface approximation to match the multi-view feature curves. The 3D surface approximation, or visual hull, generated as described above using silhouette curves, may be optimized to fit the multi-view feature curves that have been identified by a user. The optimization of the 3D surface may include smoothing the 3D surface and matching the 3D surface to the multi-view feature constraints. More specifically, 3D surface generator 130 may execute a least squares method to solve for a smooth 3D surface which interpolates position constraints from the multi-view feature curves. The 3D surface may be represented by a polygonal mesh. A smooth 3D surface may be a 3D surface in which the Laplacian of each vertex of a polygonal mesh trends towards zero.

3D surface generator 130 may compute the Laplacian at each vertex of the polygonal mesh using edge weights from a standard cotangent formula. The cotangent formula may be scaled by the inverse vertex area of the polygonal mesh. The edge weights may be computed from the visual hull domain and may remain fixed at constant values for the remainder of the 3D surface optimization. Fixing the edge weights at constant values throughout the 3D surface optimization process may linearize the solution of the optimized 3D surface. Fixing the edge weights at constant values may also avoid numerical stability issues which may occur due to degradation of the quality of the polygonal mesh during the surface optimization process.

To optimize the 3D surface, 3D surface generator 130 may select surface areas of the 3D surface domain that may be interpolated to match position constraints from the multi-view feature curves. 3D surface generator 130 may also select surface areas of the 3D surface domain that may remain on the surface of the visual hull. For surface areas of the 3D surface domain which may remain on the visual hull, 3D surface generator 130 may not need to determine which parts of the base domain correspond to which parts of the visual hull. Such a determination may be avoided by noting that each vertex of the polygonal mesh may be sent to its own original position on the visual hull. This method may avoid the issue of "fold over," in which moving different parts of a polygonal mesh surface towards a constraint curve causes undesirable wrinkles in the polygonal mesh surface.

Figure 10C:
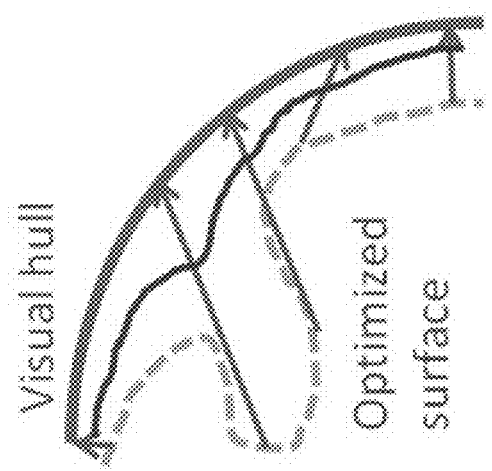
FIGS. 10A-10C illustrate an example method which may used to avoid "fold over" in the optimized 3D surface, according to various embodiments.
Figure 10B:
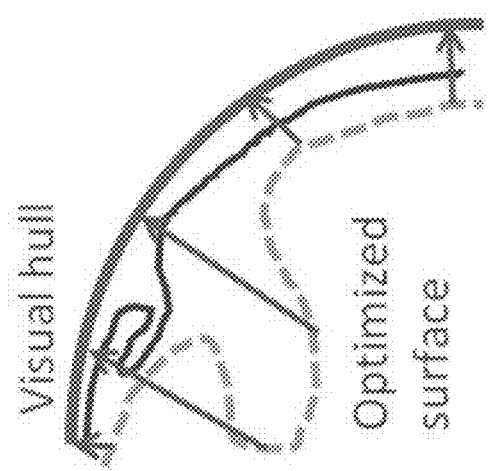
Figure 10A:
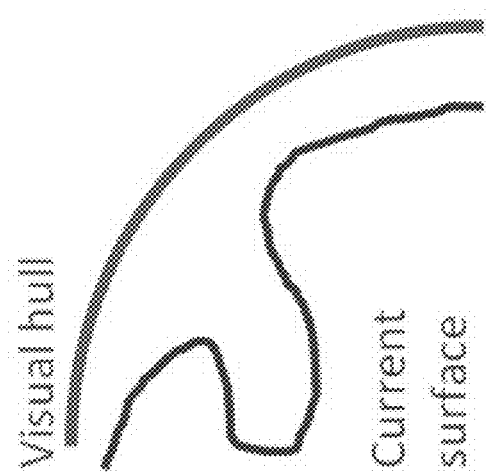

FIGS. 10A-10C illustrate an example method which may used to avoid "fold over" in the optimized 3D surface. FIG. 10A illustrates a current surface and a visual hull. The current surface may be identified as a smooth surface that may be pulled closer to the visual hull in order to match the visual hull. FIG. 10B illustrates the original current surface (dashed curve), the optimized surface (solid, center curve) and the visual hull. FIG. 10B illustrates a potential result of dynamically choosing the mapping between the surface and the visual hull. As illustrated in FIG. 10B, unwanted folds may be introduced into the optimized surface by projecting points on the surface (illustrated by the arrows in FIG. 10B) to corresponding closest points on the visual hull. FIG. 10C illustrates an example of pulling the points on the surface toward their original positions on the visual hull. As shown in FIG. 10C, the optimized surface may not include any "fold over" issues.

The "fold over" issue may also arise when position constraints from the multi-view feature curves are introduced into the 3D surface optimization. 3D surface "fold-over" may occur if the multi-view feature curve points are simply matched with the closest points on the mesh surface of the visual hull. 3D surface generator 130 may reduce the surface "fold over" by considering the different viewpoints from which a feature curve is visible in the images of the object. An incomplete list of the camera viewpoints from which each portion of a feature curve is visible may be available from the multi-view feature curve fitting step described above. The list of camera viewpoints from which each portion of a feature curve is visible may be incomplete because the user may have not have indicated the feature curve in all images in which the feature curve is visible. As an example, if a triangle is not visible from a particular camera viewpoint, because the triangle is occluded or facing the wrong direction, then points on that triangle may not be considered as possible closest for any point on the feature curve visible from that particular camera viewpoint. In addition, 3D surface generator 130 may scale down distances in the average direction of the camera viewpoints in order to bias the matching in that particular direction, which may reduce surface "fold over."

3D surface generator 130 may also reduce surface fold over by introducing intermediate point matches which may be specifically biased to find intermediate points on a surface. More specifically, given two possible point matches for a 3D surface, 3D surface generator 130 may consider the average direction to the 3D surface and may try to find an intermediate point match which lies between the two matches. 3D surface generator may scale distances in the average direction to 25% of normal. For surface features on a deeply concave portion of the visual hull surface, 3D surface generator 130 may also define a specific projection direction for locating matching surface points.

To optimize the 3D surface, 3D surface generator 130 may satisfy all constraints using a least squares method. Accordingly, it may be rare for any constraints to be exactly satisfied. Accordingly, 3D surface generator 130 may iteratively solve for the smooth surface and may adjust the weight of the constraints based on estimates of the importance of the constraints. 3D surface generator 130 my start with multi-view feature curve constraints and smoothness terms heavily weighted, which may allow all points on the visual hull the freedom to move away from the visual hull to satisfy the multi-view feature constraints and the smoothness terms. 3D surface generator 130 may then gradually re-introduce the constraints of the visual hull based on the smoothness of the resulting surface. More specifically, as the iterative solution for the 3D surface progresses, 3D surface generator 130 may increase the weights of the visual hull constraints for polygonal mesh vertices that are outside of the visual hull. 3D surface generator 130 may also increase the weights of the visual hull constraints for polygonal mesh vertices that are nearest to portions of the visual hull which have no vertices within a particular, pre-determined distance.

To perform the linear least squares method to solve for the optimized 3D surface, 3D surface generator 130 may express each constraint in a matrix form, with each constraint defining a row of a linear system expressed as shown in equation 1:

$$Ax=b \qquad (1)$$

Smoothness constraints, which may constrain the Laplacian of each vertex v to a value of zero, may be expressed as shown in equation 2:

$$\Sigma(w\_i(v-v\_i))=0 \qquad (2)$$

where $v\_i$ are the neighbors of vertex v, and $w\_i$ are the cotangent weights scaled by inverse vertex area. Position constraints for a vertex v may be expressed as shown in equation 3:

$$v=v\_t\,arg\,et \qquad (3)$$

Position constraints for a point on a triangle with vertices (v0,v1,v2) may be expressed via the barycentric coordinates of the point (b0,b1,b2), which satisfies equation 4:

$$v_0 b_0 + v_1 b_1 + v_2 b_2 = v\_t\,arg\,et \qquad (4)$$

Once the rectangular matrix A and right hand side b are constructed, the linear system may be solved in a least squares sense by solving the normal equation as shown in equation 5:

$$A^{\wedge}TAx=A^{\wedge}Tb \qquad (5)$$

Since $A^{\wedge}T\,A$ is a symmetric positive definite linear system in this case, a sparse Cholesky solver, such as CHOLMOD, may be used to find the solution.

Figure 11B:
FIG. 11B illustrates an example of a visual hull on which a surface optimization has been performed, according to various embodiments.

FIG. 11A illustrates an example of a visual hull that has been generated from multiple silhouette curves, according to various embodiments. FIG. 11B illustrates an example of a visual hull on which a surface optimization has been performed, according to various embodiments. The white lines on FIGS. 11A and 11B indicate points on the surface of the visual hull onto which the sample points of the multi-view feature curves were matched. The diagonal lines on FIGS. 11A and 11B illustrate examples of adjusting the 3D surface from the visual hull points down to the feature curve points.

Additional User Interactions

In some embodiments, a user may provide additional feedback to the 3D model generator after the 3D model has been generated. For example, a user may improve the 3D model generated by the system by correcting errors in the surface of the 3D model. 3D model generator 100 may enable, via user interface 102, a variety of user interactions by which a user may provide feedback for changing or correcting the 3D model. The following list provides examples of such user interactions.

Marking Negative Space

A silhouette curve identified in an image of an object may accurately represent the outline of an object for most regions of the object. However, some errors may exist in small regions of the outline of the object. In such regions, the silhouette curve may provide an unacceptable representation of the shape of the object. In such a case, a user may further optimize a visual hull by marking, as part of a silhouette curve, negative space that may be removed from the visual hull. As an example, a user may select an entire error region for deletion from the visual hull. As another example, the user may make a cutting stroke on the image display. Dependent on the position of the user's cutting stroke, 3D model generator 100 may automatically select a region of the object with the least amount of surface area. The region selected by 3D model generator 100, dependent on the cutting stroke from the user, may be the region that is removed from the visual hull.

Figure 12:
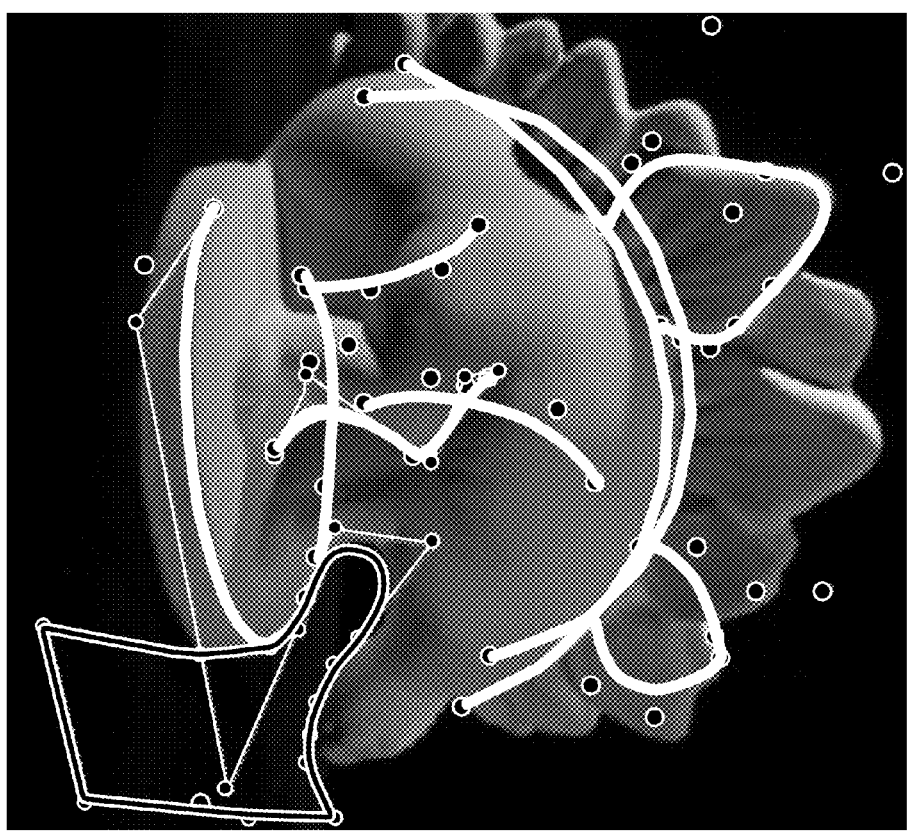
FIG. 12 illustrates an example of user input which marks negative space on am image, according to various embodiments.

FIG. 12 illustrates an example of user input which may mark negative space on an image. The example of a negative space marked by a user on an image is illustrated by the region enclosed within the black line in FIG. 12. The negative space identified by the user in FIG. 12 may indicate a region that is to be removed from the visual hull. A thin, concave object feature, such as the example object feature illustrated in FIG. 12, may be difficult to capture in an image. Accordingly, an accurate representation of the object feature may require more silhouette curves than other regions of the object. User identification of the negative space may indicate feature(s) of the object which may require additional silhouette curves.

Painting Smoothness Weights

In some embodiments, the visual hull surface may have high-frequency errors that may be a result of ambiguity in the positioning of silhouette curves. 3D model generator 100 may not be able to distinguish the noise generated by the high-frequency errors from data which represents true features of the 3D surface. As a result, dependent on the strength of the smoothness term used to generate an optimized 3D surface, 3D surface generator 130 may either fail to smooth out such high frequency errors, or may eliminate key features from the surface of the 3D model.

To reduce the effects of the high-frequency errors, 3D model generator 100 may enable a user to paint additional smoothness weights on the images. 3D surface generator 130 may project the additional smoothness weight down to the visual hull and may re-generate an optimized 3D surface dependent on the user-applied smoothness weights. The smoothness weights may guide the strength of the smoothness term used in the 3D surface optimization process. For example, positive smoothness weights may increase surface smoothness. As another example, negative smoothness weights may result in a 3D surface that more closely matches the visual hull. A user may apply the weights to the surface of the visual hull to guide the 3D surface generation process. In other embodiments, a user may also, or instead, apply such weights to guide the initial construction of the visual hull, or to correct the visual hull.

Adding Cutting Planes

A visual hull may contain topological errors which may cause neighboring surface features to be merged. To reduce the occurrence of this problem, 3D model generator 100 may enable a user to separate the geometry of an object. For example, the user may draw a line on a display of an image of an object. The line may indicate a line which the polygonal mesh which represents the object should not cross. To support this feature, when executing the marching cubes algorithm described above, 3D surface approximator 120 may locate cubes which cross a cutting plane identified by a user. 3D surface approximator 120 may refine cubes that cross a cutting plane, and contain at least a portion of the 3D surface, to the finest level. Such cubes may then be marked as empty to ensure that no object geometry may cross through the cubes. As an example, user may add cutting planes to silhouette curves to guide the construction of the visual hull.

Remapping Feature Lines

Since feature curves may be mapped to the 3D surface in a heuristic manner, some of the feature curves may not be placed in the most accurate position on the polygonal surface mesh. This may be especially true for feature curves that originate from a deep concavity in the shape of an object. Accordingly, a user may be able to interactively adjust the mapping of feature curves to the 3D surface. As an example, the user may select a point on a feature curve and may explicitly define a corresponding point on the 3D surface to which the feature curve point should be mapped. 3D model generator 100 may then effectively decrease the distance between the points identified by the user such that the user indicated point mapping will occur in the next optimization of the 3D surface. 3D model generator 100 may then remap all other points on the feature curve using the same distance bias. Accordingly, the feature curve will be mapped to the 3D surface as indicated by the user. As another example, the user may also define specific point mappings for multiple points on a feature curve. In such an example, the bias direction and factor used by 3D model generator 100 may be interpolated to a value between these constrained points. As yet another example, a user may adjust the bias direction directly, without defining any particular feature curve to 3D surface mapping. Such an example may result in faster correction of 3D surface errors, for example, in a case in which a large group of feature curves is incorrectly mapped in a similar fashion. The user may remap feature lines for either, or both of, the visual hull and the 3D surface.

Editable Shape Constraints

As described above, the 3D shape constraints generated from the user identified feature curves may be editable shape constraints by which the user may manipulate the shape of the 3D model. 3D model generator 100 may convert the 3D shape constraints into a set of editable shape constraints which the user may manipulate, on a visual display of the 3D model. For example, the set of editable shape constraints may be a plurality of handles which the user may select and move in order to change the shape of corresponding features of the 3D model. As an example, each segment of a 3D Bezier spline which represents a 3D shape constraint may be a handle which a user may select and drag to change the shape of the object feature that corresponds to the 3D shape constraint.

Example System

Figure 13:
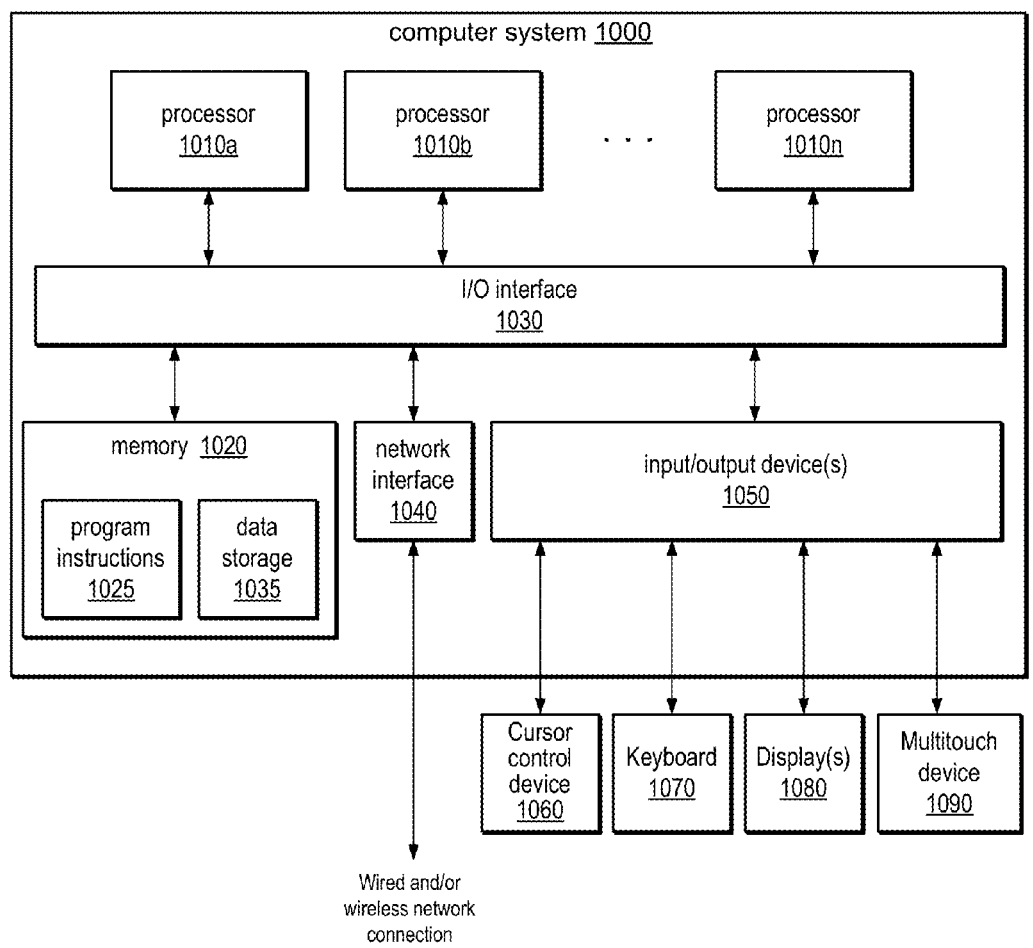
FIG. 13 illustrates an example of a computer system that may be used in various embodiments.

Various components of embodiments of methods as illustrated and described in the accompanying description may be executed on one or more computer systems, which may interact with various other devices. One such computer system is illustrated by FIG. 13. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (for example, two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 13, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   receiving images of an object captured from a plurality of different viewpoints of the object;
   receiving input that is considered to have been drawn onto features of the object and not onto portions of the images that are not part of the object, the input effective to derive a plurality of feature curves for the object, including one or more multi-view feature curves and two or more single-view feature curves, the one or more multi-view feature curves corresponding to said feature curves that are indicative of a shape of the object derived from the input that is considered to have been drawn onto the features of the object and not onto the portions of the images that are not part of the object in more than one of the images and the two or more single-view feature curves each corresponding to one said feature curve that is derived from the input that is considered to have been drawn onto the features of the object in a respective one of the images;
   generating one or more three-dimensional (3D) shape constraints for the object from the one or more multi-view feature curves and independent of the two or more single-view feature curves;
   generating an approximation of a 3D surface for the object from the two or more single-view feature curves; and
   generating a 3D model of the object from the one or more 3D shape constraints and the 3D surface approximation.

2. The method of claim 1, wherein receiving the input comprises receiving user input via a user interface to outline the features of the object on a display of one or more of the images.

3. The method of claim 1, wherein generating the one or more 3D shape constraints for the object comprises:

for each multi-view feature curve:
  selecting, from the images, at least two images which contain the multi-view feature curve, wherein each one of the at least two images contains a different view of the multi-view feature curve;
  generating a multi-view 3D shape constraint for the multi-view feature curve based on image data and camera parameters for the selected images; and
  generating a respective one of the one or more 3D shape constraints based on the multi-view 3D shape constraint and image data for other images which contain the multi-view feature curve.

4. The method of claim 1, wherein generating the approximation of the 3D surface comprises performing an adaptive, marching cubes octree method.

5. The method of claim 1, wherein generating the 3D model of the object comprises smoothing the approximation of the 3D surface and optimizing the approximation of the 3D surface to satisfy the one or more 3D shape constraints.

6. The method of claim 1, wherein the two or more single-view feature curves are silhouette curves.

7. The method of claim 1, wherein generating the 3D model further comprises receiving user input which defines the surface of the 3D model and includes at least one of marking negative space, painting smoothness weights, adding cutting planes, or remapping feature lines.

8. The method of claim 1, wherein generating the 3D model of the object includes transforming the one or more 3D shape constraints into editable shape constraints that are included as part of the 3D model of the object and are editable on the 3D model by a user to change a shape of the 3D model of the object.

9. A computer-readable storage device storing program instructions executable on a computer to implement a 3D model generator configured to perform operations comprising:
  receiving images of an object captured from a plurality of different viewpoints of the object;
  receiving input that is considered to have been drawn onto features of the object and not onto portions of the images that are not part of the object, the input effective to derive a plurality of feature curves for the object, including one or more multi-view feature curves and two or more single-view feature curves, the one or more multi-view feature curves corresponding to said feature curves that are indicative of a shape of the object derived from the input that is considered to have been drawn onto the features of the object and not onto the portions of the images that are not part of the object in more than one of the images and the two or more single-view feature curves each corresponding to one said feature curve that is derived from the input that is considered to have been drawn onto the features of the object in a respective one of the images;
  generating one or more three-dimensional (3D) shape constraints for the object based on the one or more multi-view feature curves and independent of the two or more single view feature curves;
  generating an approximation of a 3D surface for the object based on the two or more single-view feature curves; and
  generating a 3D model of the object based on the one or more 3D shape constraints and the 3D surface approximation.

10. The computer-readable storage device of claim 9, wherein receiving the input comprises receiving user input via a user interface that outlines the features of the object on a display of one or more of the images.

11. The computer-readable storage device of claim 9, wherein generating the one or more 3D shape constraints for the object comprises:
  for each multi-view feature curve:
    selecting, from the images, at least two images which contain the multi-view feature curve, wherein each one of the at least two images contains a different view of the multi-view feature curve;
    generating a multi-view 3D shape constraint for the multi-view feature curve based on image data and camera parameters for the selected images; and
    generating a respective one of the one or more 3D shape constraints based on the multi-view 3D shape constraint and image data for other images which contain the multi-view feature curve.

12. The computer-readable storage device of claim 9, wherein generating the approximation of the 3D surface comprises performing an adaptive, marching cubes octree method.

13. The computer-readable storage device of claim 9, wherein generating the 3D model of the object comprises smoothing the approximation of the 3D surface and optimizing the approximation of the 3D surface to satisfy the one or more 3D shape constraints.

14. The computer-readable storage device of claim 9, wherein generating the 3D model of the object includes transforming the one or more 3D shape constraints into editable shape constraints that are included as part of the 3D model of the object and are editable on the 3D model by a user to change a shape of the 3D model of the object.

15. A system, comprising:
  a memory; and
  one or more processors coupled to the memory, wherein the memory stores program instructions executable by the one or more processors to implement a 3D model generator configured to perform operations comprising:
    receiving images of an object captured from a plurality of different viewpoints of the object;
    receiving input that is considered to have been drawn onto features of the object and not onto portions of the images that are not part of the object, the input effective to derive a plurality of feature curves for the object, including one or more multi-view feature curves and two or more single-view feature curves, the one or more multi-view feature curves corresponding to said feature curves that are indicative of a shape of the object derived from the input that is considered to have been drawn onto the features of the object and not onto the portions of the images that are not part of the object in more than one of the images and the two or more single-view feature curves each corresponding to one said feature curve that is derived from the input that is considered to have been drawn onto the features of the object in a respective one of the images;
    generating one or more three-dimensional (3D) shape constraints for the object from the one or more multi-view feature curves;
    generating, separately from generating the one or more 3D shape constraints for the object, an approximation of a 3D surface for the object from the two or more single-view feature curves and independent of the one or more multi-view feature curves; and
    generating a 3D model of the object based on the one or more 3D shape constraints and the 3D surface approximation.

16. The system of claim 15, wherein receiving the input comprises receiving user input via a user interface to outline the features of the object on a display of one or more of the images.

17. The system of claim 15, wherein generating the one or more 3D shape constraints for the object comprises:
for each multi-view feature curve:
selecting, from the images, two images which contain the multi-view feature curve, wherein each one of the two images contains a different view of the multi-view feature curve;
generating a two-view 3D shape constraint for the multi-view feature curve based on image data and camera parameters for the selected two images;
generating a respective one of the one or more 3D shape constraints based on the two-view 3D shape constraint and image data for other images which contain the multi-view feature curve.

18. The system of claim 15, wherein generating the approximation of the 3D surface comprises performing an adaptive, marching cubes octree method.

19. The system of claim 15, wherein generating the 3D model of the object comprises smoothing the approximation of the 3D surface and optimizing the approximation of the 3D surface to satisfy the one or more 3D shape constraints.

20. The system of claim 15, wherein generating the 3D model of the object includes transforming the one or more 3D shape constraints into editable shape constraints that are included as part of the 3D model of the object and are editable on the 3D model by a user to change a shape of the 3D model of the object.

* * * * *